(12) United States Patent
Milazzo

(10) Patent No.: US 9,890,008 B2
(45) Date of Patent: Feb. 13, 2018

(54) STACKING MACHINE AND METHOD OF USING

(71) Applicant: PERM Machine & Tool Co., Inc., St. John, IN (US)

(72) Inventor: Lee J. Milazzo, St. John, IN (US)

(73) Assignee: PERM Machine & Tool Co., Inc., St. John, IN (US)

( * ) Notice: Subject to any disclaimer, the term of this patent is extended or adjusted under 35 U.S.C. 154(b) by 0 days.

(21) Appl. No.: 15/044,721

(22) Filed: Feb. 16, 2016

(65) Prior Publication Data

US 2016/0236893 A1     Aug. 18, 2016

Related U.S. Application Data

(60) Provisional application No. 62/117,238, filed on Feb. 17, 2015.

(51) Int. Cl.

| B65G 15/10 | (2006.01) |
|---|---|
| B65H 29/30 | (2006.01) |
| B65G 57/04 | (2006.01) |
| B21D 43/22 | (2006.01) |
| B21D 51/26 | (2006.01) |

(52) U.S. Cl.
CPC .............. *B65H 29/30* (2013.01); *B21D 43/22* (2013.01); *B65G 57/04* (2013.01); *B21D 51/2692* (2013.01); *B65H 2301/4212* (2013.01); *B65H 2301/44734* (2013.01); *B65H 2511/20* (2013.01); *B65H 2601/324* (2013.01); *B65H 2601/61* (2013.01); *B65H 2701/173* (2013.01)

(58) Field of Classification Search
CPC ............ B65H 2220/01; B65H 2511/11; B65H 29/30; B65G 21/2018; B65G 21/10; Y10T 83/2192
USPC ... 198/370.3, 472.1, 586, 626.3, 679, 861.1; 271/193, 3.18, 901; 414/793.3
See application file for complete search history.

(56) References Cited

U.S. PATENT DOCUMENTS

| 961,586 A | 6/1910 | Dexter |
|---|---|---|
| 1,819,841 A | 8/1931 | Hudson |

(Continued)

FOREIGN PATENT DOCUMENTS

| EP | 0231534 | 8/1987 |
|---|---|---|
| JP | 55-151410 | 11/1980 |

(Continued)

OTHER PUBLICATIONS

International Search Report dated Jun. 7, 2016; PCT/US2016/018162.

*Primary Examiner* — Gregory W Adams
(74) *Attorney, Agent, or Firm* — Hartman Global IP Law; Gary M. Hartman; Domenica N. S. Hartman

(57) ABSTRACT

Stacking machines, delivery units, and methods suitable for handling and stacking sheets of material, and particularly sheets of magnetizable materials that are relatively heavy and susceptible to damage during a stacking operation. Such a stacking machine includes at least one delivery unit equipped with a belt and a magnetic unit. The belt and magnetic unit are adapted to operate in cooperation with each other to magnetically carry individual sheets of a magnetizable material from one side of the machine to another. The delivery unit may be part of a kit that can be installed as a unit on an existing stacking machine.

17 Claims, 4 Drawing Sheets

(56) References Cited

U.S. PATENT DOCUMENTS

| | | | |
|---|---|---|---|
| 1,892,590 A | | 12/1932 | Steele et al. |
| 2,015,809 A | | 10/1935 | Moore |
| 2,261,972 A | | 11/1941 | Matthews |
| 2,373,149 A | | 4/1945 | Strickler et al. |
| 2,374,174 A | | 4/1945 | Buccicone |
| 2,406,489 A | | 8/1946 | Case |
| 2,486,733 A | | 11/1949 | Buccicone |
| 2,527,911 A | | 10/1950 | Buccicone |
| 2,540,971 A | | 2/1951 | Wagner, Jr. et al. |
| 2,626,800 A | | 1/1953 | Martin |
| 2,797,085 A | | 6/1957 | Crafts |
| 2,854,236 A | | 9/1958 | Kaddeland |
| 2,897,952 A | | 8/1959 | Buccicone |
| 2,901,249 A | | 8/1959 | Dexter et al. |
| 3,032,340 A | | 5/1962 | Lawrence |
| 3,172,526 A | | 3/1965 | Buccicone |
| 3,199,654 A | * | 8/1965 | Buccicone ......... B65G 21/2018 198/679 |
| 3,224,757 A | * | 12/1965 | Parke ................. B65G 59/045 271/10.01 |
| 3,229,805 A | * | 1/1966 | Buccicone ......... B65G 21/2018 198/679 |
| 3,425,688 A | * | 2/1969 | Ross ..................... B21D 43/18 271/193 |
| 3,782,529 A | * | 1/1974 | Buccicone ......... B65G 21/2018 198/679 |
| 3,795,301 A | | 3/1974 | Sugitani |
| 3,847,269 A | | 11/1974 | Buccicone |
| 3,942,784 A | * | 3/1976 | Buccicone ............. B65H 29/14 193/35 R |
| 4,136,781 A | | 1/1979 | Perry et al. |
| 5,221,177 A | * | 6/1993 | Messerly ............... B21D 43/22 271/193 |
| 5,245,901 A | * | 9/1993 | Lentz ................. B21D 43/287 198/433 |
| 6,012,568 A | * | 1/2000 | Kane ..................... B65G 21/10 198/817 |
| 6,142,465 A | | 11/2000 | Stahly |
| 6,247,581 B1 | * | 6/2001 | Oswald ................. B65G 21/10 198/812 |
| 6,471,050 B2 | * | 10/2002 | Ikeda ..................... B65G 43/08 198/345.1 |
| 6,840,733 B2 | | 1/2005 | Bjorn et al. |
| 7,281,710 B2 | | 10/2007 | Okazaki et al. |
| 7,467,708 B2 | * | 12/2008 | McGettigan .......... B65G 15/32 198/812 |
| 7,762,386 B2 | * | 7/2010 | Allore ................... B65G 17/46 198/472.1 |
| 7,810,635 B2 | * | 10/2010 | Kim ................. H01L 21/67748 198/465.1 |
| 7,909,159 B1 | * | 3/2011 | Zats ..................... B65G 15/12 198/586 |

FOREIGN PATENT DOCUMENTS

| | | |
|---|---|---|
| JP | 57-009606 | 1/1982 |
| JP | 11-011632 | 1/1999 |
| WO | 36-18562 | 6/1996 |

* cited by examiner

STACKING MACHINE AND METHOD OF USING

CROSS REFERENCE TO RELATED APPLICATIONS

This application claims the benefit of U.S. Provisional Application Ser. No. 62/117,238, filed Feb. 17, 2015, the contents of which are incorporated herein by reference.

BACKGROUND OF THE INVENTION

The present invention generally relates to handling and stacking equipment for sheet-type articles and materials. The invention particularly relates to sheet handling and stacking machines adapted to stack sheets of tin plate and other metallic sheets that are relatively heavy and susceptible to damage during a stacking operation.

"Tin plate" is a term that is commonly used to refer to metal sheet materials of the type used to produce the outer cylinders of cans, for example, food, beverage, and aerosol cans. Prior to being formed to produce a can, tin plate sheets are typically processed to have a printed surface so that each individual sheet provides the printed information desired or required for the final can product. The sheets are individually printed and stacked prior to being delivered to equipment that forms and welds the sheets and then assembles the resulting cylinder with one or more ends, for example, to produce a three-piece can.

A particular stacking machine known in industry has been referred to as a Dexter Stacker, which had been manufactured by the Dexter Folder Company and/or its successor, Miehle-Goss-Dexter, Inc. A particular machine of this type is capable of stacking sheets at high rates onto a pallet. However, a problem encountered with such machines is that tin plate and other relatively heavy sheets tend to "dive" as they fall onto the pallet, causing the sheet to scratch the upper surface of the preceding sheet in the stack. In the case of printed tin plate used to produce cans, damage can occur to the printed surface. Because printed tin plate sheets must ordinarily undergo stacking prior to deliver to the forming equipment, there is a need to be able to stack the sheets without scratching their printed surfaces.

BRIEF DESCRIPTION OF THE INVENTION

The present invention provides machines and methods suitable for handling and stacking sheets of material, and particularly sheets of magnetizable materials that are relatively heavy and susceptible to damage during a stacking operation.

According to one aspect of the invention, a stacking machine includes at least one delivery unit comprising a belt and a magnetic means. The belt and magnetic means are adapted to operate in cooperation with each other to magnetically carry individual sheets of a magnetizable material from one side of the machine to another.

According to another aspect of the invention, a method of stacking individual sheets of a magnetizable material uses a stacking machine to operate a belt and a magnetic means in cooperation with each other to magnetically carry the individual sheets from one side of the machine to another, and then stack the individual sheets on top of each other.

According to yet another aspect of the invention, a kit is provided for modifying an existing stacking machine adapted to stack individual sheets. The kit comprises a belt and a magnetic means that are adapted to be installed on the stacking machine as a unit, which may be one of any number of units installed on the stacking machine to replace one or more existing delivery mechanisms previously installed on the stacking machine.

Technical effects of the machines and methods described above preferably include the ability to convey and release individual sheets in a manner that will minimize damage to the sheets, including scratching of their surfaces, as well as minimize damage to sheets already in a stack on which the sheets are being dropped.

Other aspects and advantages of this invention will be better appreciated from the following detailed description.

DETAILED DESCRIPTION OF THE INVENTION

Figure 1:
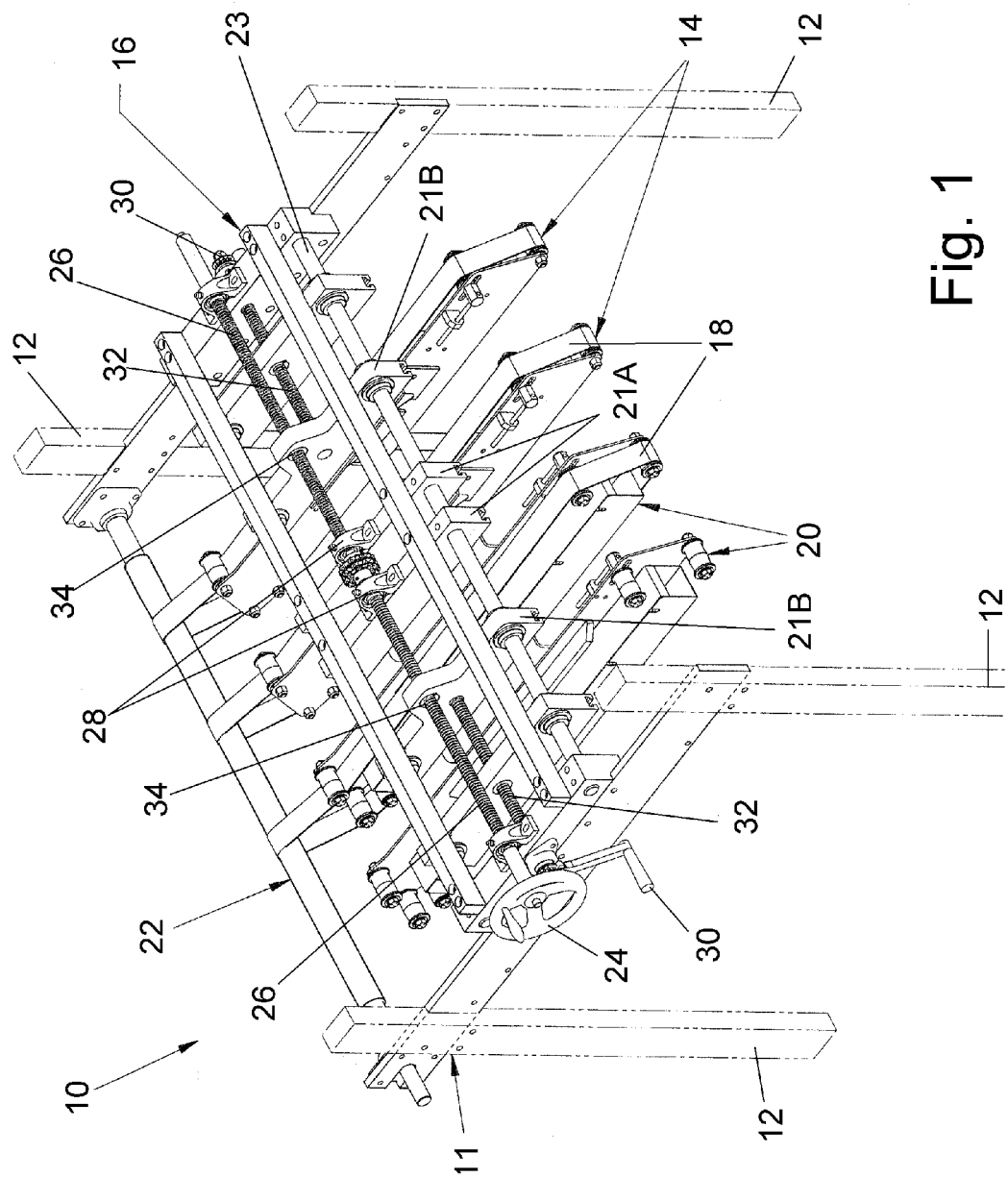
FIG. 1 is a perspective view representing a stacking machine equipped with multiple magnetic delivery units in accordance with a nonlimiting embodiment of this invention.
Figure 2:
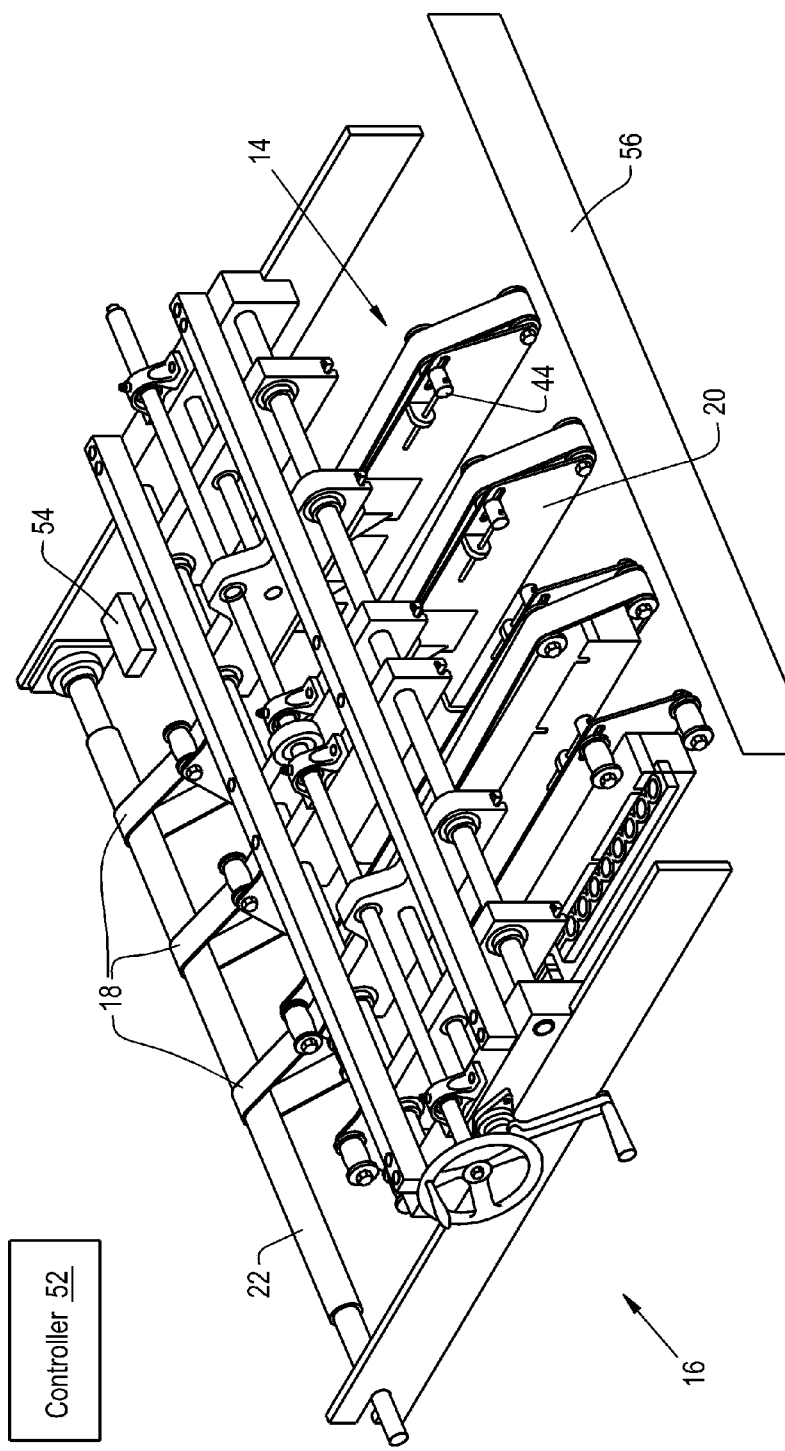
FIG. 2 is a perspective view of a portion of the machine of FIG. 1.

FIG. 1 represents a stacking machine 10 in accordance with a nonlimiting embodiment of the invention. The machine 10 includes a frame 11 comprising legs 12 for supporting components of the machine 10 that perform certain aspects of a stacking operation. These components include multiple magnetic delivery units 14 suspended beneath a carriage 16. The carriage 16 and its delivery units 14 are shown in isolation in FIG. 2, and an individual delivery unit 14 is shown in isolation in FIG. 3. FIGS. 1 and 2 represent the machine 10 and carriage 16 as having four delivery units 14, though it should be understood that fewer or more units 14 could be employed. Each delivery unit 14 is effectively a delivery means, which as used herein is defined as serving to deliver a sheet from one side of a stacking machine to another. As discussed below, when adapted to transport sheets formed of a magnetizable material, for example, tin plate, each delivery units 14 is effectively a magnetic delivery means adapted for the same purpose. The term "magnetizable" is used herein to refer to materials that can be magnetized and attracted to a magnet (i.e., ferromagnetic or ferromagnetic materials) including, but not limited to, materials containing iron, nickel, cobalt, and alloys thereof. As an example, tin plate materials typically comprise a base layer formed of a steel, over which an iron-tin alloy layer, a tin layer, and one or more protective layers are often applied.

Each delivery unit 14 includes a belt 18 and a magnetic bar unit 20, with each belt 18 (three of which are shown in FIGS. 1 and 2) individually traveling around the longitudinal length of its corresponding magnetic bar unit 20. Each belt 18 can be formed as any of a wide variety of endless or continuous loop or band of flexible material capable of being used to convey materials or to transfer motion between wheels, pulleys, or shafts. The belts 18 are represented as being driven in unison by a single drive shaft 22, though it is foreseeable that the belts 18 could be individually driven or subsets of the belts 18 could be driven in unison.

The carriage 16 supports the individual delivery units 14 so that their individual lateral positions relative to each other can be adjusted as may be desired to convey and stack a particular size of sheet stock. In FIGS. 1 and 2, this adjustment is shown as being performed with multiple power screw assemblies engaged with beams 21A and 21B that are supported by journal shafts 23 and are adapted to move laterally within the carriage 16. One such assembly includes a crank wheel 24, screws 26, and nuts 28, for example, two lead screws 26 individually engaged with the nuts 28, which are each mounted to one of the two beams 21A that support the two interior delivery units 14 as seen in FIGS. 1 and 2. Each of two additional power screw assemblies includes a pair of crank levers 30, each operating a separate screw 32 engaged with a nut 34 that is mounted in one of the two beams 21B that support the two outer delivery units 14 as seen in FIGS. 1 and 2. In this manner, some of the delivery units 14 may be adjusted while others remain fixed in their positions. Other ways of providing an adjustment capability to the machine 10 are also within the scope of the invention.

Figure 3:
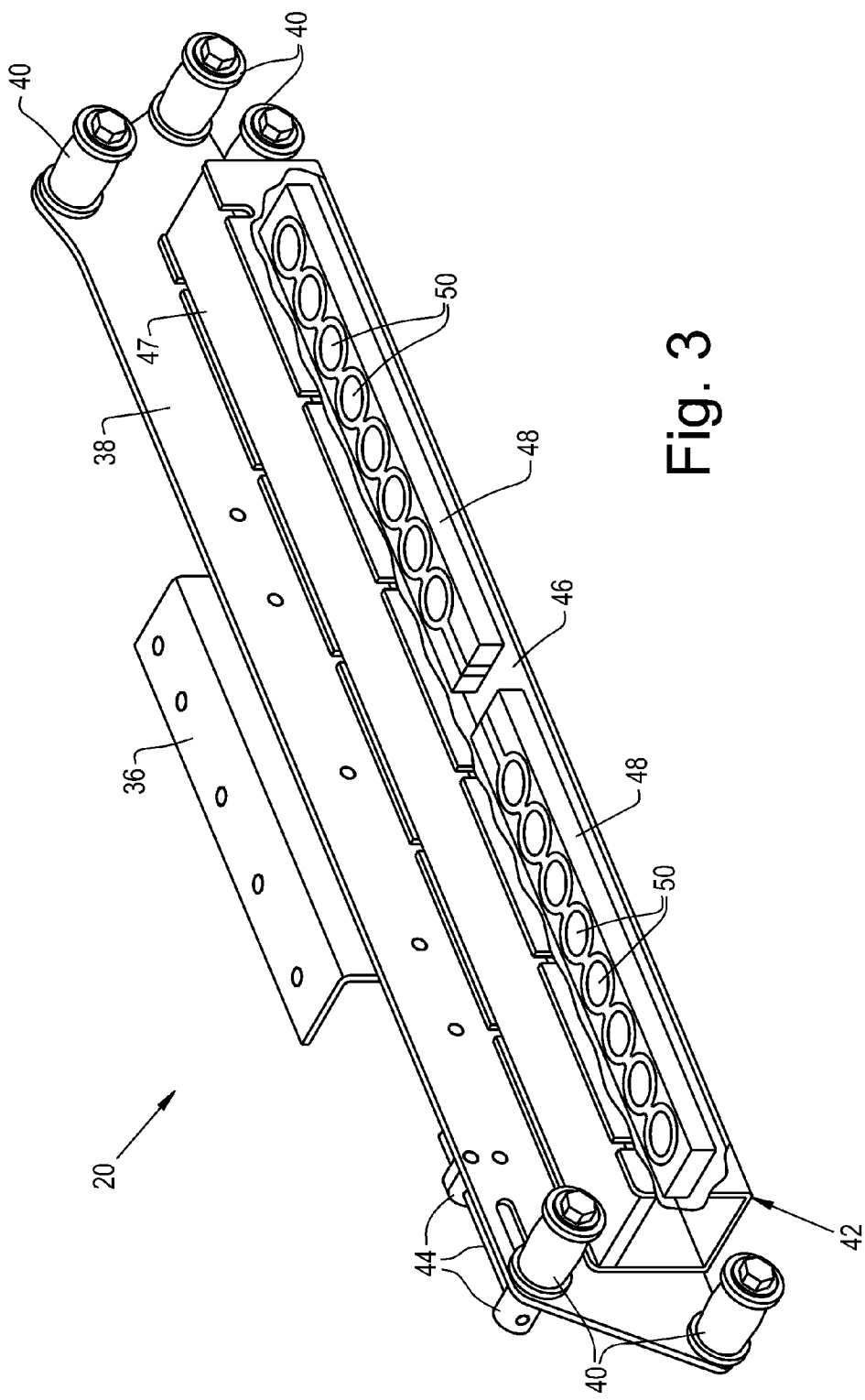
FIG. 3 is a perspective view of one of the magnetic delivery units of the machine of FIGS. 1 and 2.

The magnetic bar units 20 are effectively magnetic means adapted to magnetically carry individual sheets (not shown) from one side of the machine 10 to the other. In the particular example of FIGS. 1 and 2, sheets enter the machine 10 adjacent the drive shaft 22, and exit the opposite side of the machine 10. For illustrative purposes, FIGS. 1 and 2 depict one of the delivery units 14 without its belt 18 and with the interior of its bar unit 20 exposed. FIG. 3 represents a more detailed view of the exposed bar unit 20 of FIGS. 1 and 2. The bar unit 20 is represented as including a flange 36 and backing plate 38 by which the unit 20 can be mounted to the carriage 16, and rollers 40 on which a belt 18 (not shown in FIG. 3) travels around a housing 42 in a lengthwise direction of the housing 42. One of the rollers 40 is represented as being mounted to the backing plate 38 to enable the position of the roller 40 to be adjusted in the lengthwise direction of the housing 42, enabling the tension of the belt 18 to be adjusted with a suitable adjustment mechanism 44. The lowermost rollers 40 are represented as being in proximity to the lower wall 46 of the housing 42, such that the belt 18 is conveyed in close proximity to the lower wall 46.

FIG. 3 represents the upper wall of the housing 42 as being formed by a mounting bar 47, which can be used to secure the housing 42 to the backing plate 38. In addition, FIG. 3 represents the housing 42 as containing two magnetic bars 48, each containing a series of electromagnets 50. The electromagnets 50 are positioned within the housing 42 and in proximity to its lower wall 46 so that the belt 18 is in sufficiently close proximity to the electromagnets 50 to enable a magnetizable material to be magnetically attracted to the electromagnets 50 through the belt 18. As such, the belt 18 is permeable to the magnetic fields of the electromagnets 50 or otherwise does not interfere with the ability of a sheet of magnetizable material to be suspended by the magnetic fields of the electromagnets 50 while in contact with the belt 18. In reference to the use of the machine 10 to deliver tin plate sheets formed of a magnetizable material, the sheets will be attracted upward toward the electromagnets 50 so as to be suspended beneath the housing 42 while simultaneously being conveyed by the belt 18 from one side of the machine 10 to the other.

According to a preferred aspect of the invention, the machine 10 is operated in combination with a suitable controller 52 (FIG. 2) that causes the electromagnets 50 to be turned on in order to pick up a sheet as it enters the machine 10, and then turned off when the sheet has been sufficiently carried to the other side of the machine 10 to be released/dropped onto a stack of sheets. According to another preferred aspect of the invention, the belt 18 is also stopped as, just before, or after the electromagnets 50 are turned off in order to better control the trajectory of the sheet as it drops onto a stack of sheets. For this purpose, the belts 18 are preferably servo-driven and the machine 10 preferably utilizes suitable means to determine when to turn the electromagnets 50 on and drive the belts 18 by detecting an individual sheet as it enters the machine 10, and when to turn the electromagnets 50 off and stop the belts 18 as the sheet is prepared to exit the machine 10. FIG. 2 schematically represents a sensor 54 for this purpose, such as one or more proximity sensors. The timing of these events can be tailored to pick up and drop sheets according to their particular characteristics, including size, weight, magnetic properties, etc. It is foreseeable that the electromagnets 50 of each magnetic bar 48 could be operated independently of the other bar(s) 48, and/or individual electromagnets 50 of an individual bar 48 could be operated independently of other electromagnets 50 of the same bar 48.

FIG. 2 further schematically represents the use of a bumper 56 adjacent the exit of the machine 10, such that sheets exiting the machine 10 gently bump into the bumper 56 as they exit the machine 10 to limit their forward trajectory caused by the movement of the belt 18. The position of the machine 10 relative to a pallet (not shown) onto which the sheets are to be dropped can also be chosen to promote a desired trajectory for the sheets. In combination, these features described herein can be utilized so that each individual sheet can be conveyed by the belts 18 and released by the bar units 20 in a manner that will minimize damage to the sheet, including scratching of its printed surface, as well as damage to the preceding sheet already in the stack on which the sheet is being dropped.

According to a nonlimiting aspect of the invention, the frame 11 and its legs 12, the carriage 16, and the drive shaft 22 may all be components of an existing stacking machine, for example, one of the aforementioned Dexter Stackers, and the delivery units 14 can be members of a retrofit kit adapted to be manufactured and installed for the purpose of modifying the existing stacking machine. As such, one or more existing delivery mechanisms installed on the machine can be removed from the beams 21A and/or 21B of the carriage 16 and one or more delivery units 14 installed in its/their place. As such, a retrofit kit for producing the machine 10 shown in FIG. 1 would comprise the four delivery units 14 shown in FIG. 1, and the carriage 16, including the beams 21A and 21B, shafts 23, crank wheel 24, crank levers 30, screws 26 and 32, and nuts 28 and 34 thereof, can all be components of an existing stacking machine that are reused and remain on the machine after installation of the delivery units 14.

Figure 4:
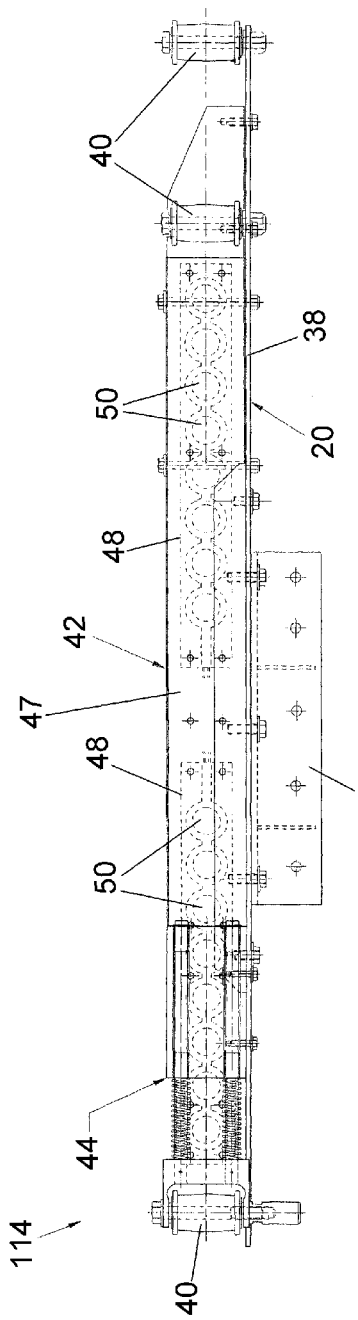
FIGS. 4 and 5 represent top and side views of another embodiment of a magnetic delivery unit that can be installed on the stacking machine of FIGS. 1 and 2.
Figure 5:
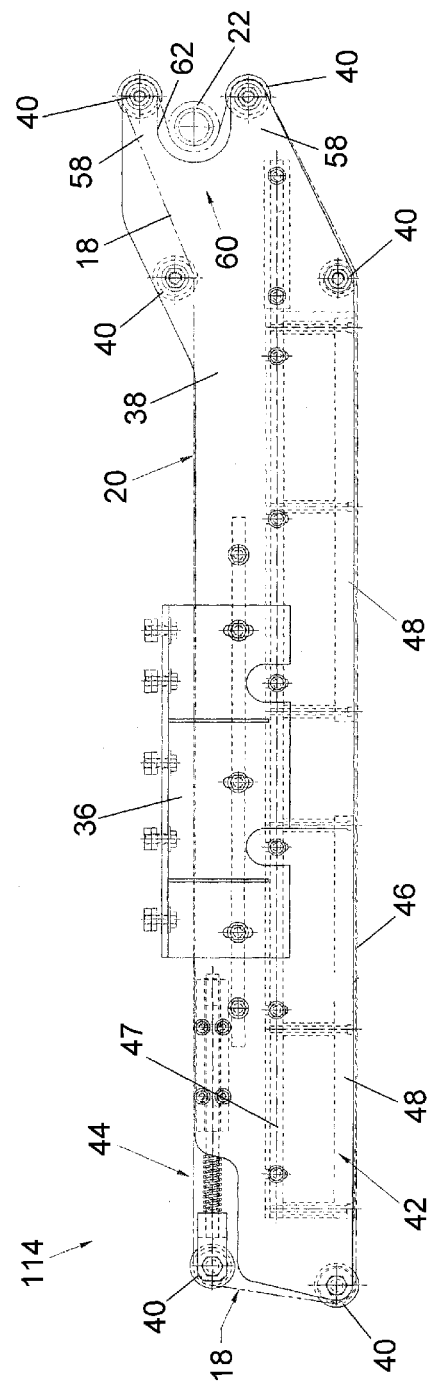

FIGS. 4 and 5 depict an alternative delivery unit 114 representative of another nonlimiting embodiment of the invention. In view of similarities that the delivery unit 114 shares with the embodiment of FIGS. 1 through 3, identical reference numerals will be used in FIGS. 4 and 5 to denote the same or functionally equivalent elements of the unit 114 as those shown for the units 14 in FIGS. 1 through 3, and the following discussion of FIGS. 4 and 5 will focus primarily on aspects of the delivery unit 114 that differ from the units 14 in some notable or significant manner. Other aspects of the unit 114 not discussed in any detail can be, in terms of structure, function, materials, etc., essentially as was described for the first embodiment.

The delivery unit 114 is depicted in FIGS. 4 and 5 with its belt 18 shown in phantom. As more readily evident in FIG. 5, the two rolls 40 in closest proximity to the drive shaft 22 are mounted on two legs 58 of a fork 60, shown as being defined as part of the backing plate 38. A recess 62 defined between the legs 58 is sized and shaped to accommodate the drive shaft 22 of the machine 10. As evident in FIG. 5, the belt 18 is not routed around the shaft 22, but instead is forced into engagement with the side of the shaft 22 facing the delivery unit 114. In this manner, the shaft 22 is not required to be removed from the machine 10 when installing or removing the unit 114 from the machine 10 or when installing or removing the belt 18 from the unit 114, as is the case with the embodiment of FIGS. 1 through 3. The engagement of the belt 18 with the shaft 22 can be adjusted with the adjustment mechanism 44.

While the invention has been described in terms of a specific preferred embodiment, it is apparent that other forms could be adopted by one skilled in the art. For example, the machine 10 could differ in appearance and construction from the embodiment shown in the Figures, the functions of each component of the machine 10 could be performed by components of different construction but capable of a similar (though not necessarily equivalent) function, and appropriate materials could be substituted for those noted. Accordingly, it should be understood that the invention is not limited to the specific embodiment illustrated in the Figures. It should also be understood that the phraseology and terminology employed above are for the purpose of disclosing the illustrated embodiment, and do not necessarily serve as limitations to the scope of the invention. Therefore, the scope of the invention is to be limited only by the following claims.

The invention claimed is:

1. A stacking machine for stacking individual sheets of a magnetizable material, the machine comprising:
    a carriage comprising beams that are adapted to move laterally within the carriage;
    delivery units supported by the beams, the delivery units comprising outer delivery units and interior delivery units that are located interiorly of the outer delivery units, each of the delivery units comprising a belt and a magnetic means, the belt and the magnetic means being adapted to operate in cooperation with each other to magnetically carry the individual sheets of a magnetizable material from one side of the machine to another side of the machine;
    a power screw assembly engaged with the beams supporting the outer delivery units to move the outer delivery units laterally to adjust lateral positions of the outer delivery units relative to the interior delivery units; and
    means for selectively turning the magnetic means on and off and selectively starting and stopping the belt of each of the delivery units in order to magnetically pick up one of the individual sheets on the one side of the machine and then release the sheet on the other side of the machine;
    wherein the carriage comprises a drive shaft engaged with the belt of each of the delivery units, each of the deliver units comprises a fork that defines a recess that accommodates the drive shaft, and the belt engages a side of the drive shaft but does not surround the drive shaft to enable the delivery unit to be installed and removed from the machine without removing the drive shaft from the machine.

2. The stacking machine according to claim 1, further comprising a second power screw assembly engaged with the beams supporting the interior delivery units to move the interior delivery units laterally to adjust lateral positions of the interior delivery units relative to the outer delivery units.

3. The stacking machine according to claim 1, wherein the belt of each of the delivery units is wrapped around the magnetic means along a longitudinal direction of the magnetic means.

4. The stacking machine according to claim 1, wherein the magnetic means of each of the delivery units comprises a housing with a lower wall adjacent a lower portion of the belt.

5. The stacking machine according to claim 4, wherein the belt of each of the delivery units is permeable to magnetic fields generated by the magnetic means to enable the individual sheets of the magnetizable material to be suspended by the magnetic fields while in contact with the lower portion of the belt.

6. The stacking machine according to claim 4, wherein the magnetic means of each of the delivery units comprises a plurality of electromagnets disposed within the housing along a longitudinal direction of the housing and the magnetic means.

7. The stacking machine according to claim 6, wherein the electromagnets are mounted in at least two bars within the housing of each of the delivery units.

8. The stacking machine according to claim 1, wherein the control means selectively turns on the magnetic means and selectively starts the belt of each of the delivery units when magnetically picking up the individual sheets, and selectively turns off the magnetic means and selectively stops the belt of each of the delivery units when magnetically releasing the individual sheets.

9. The stacking machine according to claim 1, wherein the machine is preexisting and the delivery units are installed on the machine in place of a preexisting delivery mechanism on the machine.

10. The stacking machine according to claim 1, wherein the machine and the carriage thereof are preexisting, and the delivery units are installed on the carriage in place of a preexisting delivery mechanism installed on the machine.

11. The stacking machine according to claim 7, wherein the electromagnets of each of the bars operate independently of the electromagnets of other of the bars or the electromagnets of at least one of the bars operate independently of other of the electromagnets of the at least one bar.

12. The stacking machine according to claim 1, wherein the machine, the drive shaft, and the carriage thereof are preexisting, and the delivery units are installed on the carriage in place of a preexisting delivery mechanism installed on the machine.

13. A method of retrofitting a stacking machine having a frame, a carriage, a drive shaft, and a delivery mechanism mounted to the carriage and driven by the drive shaft, the method comprising:
    removing the delivery mechanism from the carriage;
    installing delivery units supported by the carriage, each of the delivery units comprising a magnetic means and a belt engaged with the drive shaft so as to be driven by the drive shaft, the belt and the magnetic means being adapted to operate in cooperation with each other to magnetically carry individual sheets of a magnetizable material from one side of the machine to another side of the machine:

causing outer delivery units of the deliver units to move laterally to adjust lateral positions of the outer delivery units relative to interior delivery units of the deliver units; and stacking the individual sheets on top of each other at the other side of the machine by selectively turning the magnetic means on and selectively starting the belt of each of the delivery units to magnetically pick up the individual sheets on the one side of the machine and then releasing the individual sheets on the other side of the machine by selectively turning the magnetic means off and selectively stopping the belt of each of the delivery units;

wherein each of the deliver units comprises a fork that defines a recess that accommodates the drive shaft, and the method further comprises installing and removing the delivery unit from the machine without removing the drive shaft from the machine by the belt engaging a side of the drive shaft but not surrounding the drive shaft.

14. A method according to claim 13, wherein each of the individual sheets is conveyed by the belt and released by the magnetic means in a manner that reduces scratching of a printed surface on each of the individual sheets and on a preceding sheet on which each of the individual sheets is dropped.

15. A method according to claim 13, wherein the individual sheets are formed of a tin plate material.

16. A method according to claim 13, further comprising delivering a stack of the individual sheets to a forming machine to produce cans from the individual sheets.

17. A method according to claim 16, wherein the cans are food, beverage, or aerosol cans.

* * * * *